United States Patent [19]

Wojsznis et al.

[11] Patent Number: 5,453,925
[45] Date of Patent: Sep. 26, 1995

[54] SYSTEM AND METHOD FOR AUTOMATICALLY TUNING A PROCESS CONTROLLER

[75] Inventors: Wilhelm K. Wojsznis; Terrence L. Blevins, both of Round Rock, Tex.

[73] Assignee: Fisher Controls International, Inc., Clayton, Mo.

[21] Appl. No.: 70,090

[22] Filed: May 28, 1993

[51] Int. Cl.$^6$ .......................... G05B 13/00; G05B 11/42
[52] U.S. Cl. .................... 364/157; 318/561; 364/162; 364/177
[58] Field of Search .................. 364/157, 148, 364/149, 150, 157, 161, 162, 63, 151, 152, 153, 154, 155, 156, 158, 160, 176, 177; 318/561, 596, 609, 610

[56] References Cited

U.S. PATENT DOCUMENTS

| | | | |
|---|---|---|---|
| 3,798,426 | 3/1974 | Bristol, II | 364/177 |
| 4,441,151 | 4/1984 | Hayashibe | 364/157 |
| 4,466,054 | 8/1984 | Shigemasa et al. | 364/162 |
| 4,481,567 | 11/1984 | Kaya et al. | 364/157 |
| 4,549,123 | 10/1985 | Hagglund et al. | 318/610 |
| 4,602,326 | 7/1986 | Kraus | 364/158 |
| 4,669,040 | 5/1987 | Pettit et al. | 364/162 |
| 4,754,391 | 6/1988 | Suzuki | 364/157 |
| 4,758,943 | 7/1988 | Astrom et al. | 364/157 |
| 4,768,143 | 8/1988 | Lane et al. | 364/157 |
| 4,814,968 | 3/1989 | Fukumoto | 364/177 |
| 4,855,674 | 8/1989 | Murate et al. | 364/157 |
| 4,881,160 | 11/1989 | Sakai et al. | 364/161 |
| 4,882,526 | 11/1989 | Iino et al. | 364/150 |
| 4,908,747 | 3/1990 | Lane et al. | 364/162 |
| 4,954,975 | 9/1990 | Kalata | 364/567 |
| 4,959,767 | 9/1990 | Buchner et al. | 364/157 |
| 5,057,992 | 10/1991 | Traiger | 364/148 |
| 5,057,993 | 10/1991 | Kanda | 364/162 |
| 5,081,590 | 1/1992 | Gominho et al. | 364/481 |
| 5,124,626 | 6/1992 | Thoen | 318/610 |
| 5,229,699 | 7/1993 | Chu et al. | 318/610 |
| 5,247,458 | 9/1993 | Cabot | 364/550 |
| 5,268,625 | 12/1993 | Plummer | 318/610 |
| 5,283,729 | 2/1994 | Lloyd | 364/157 |

OTHER PUBLICATIONS

Kaya, A. et al., *Tuning of PID Controls of Different Structures*, Control Engineering, pp. 62–65 (Jul. 1988).
Astrom and Hagglund, "A Frequency Domain Method for Automatic Tuning of Simple Feedback Loops," Proceedings of 23rd Conference on Decision and Control, 299–304, 1984.
Astrom and Hagglund, "Automatic Tuning of Simple Regulators with Specifications on Phase and Amplitude Margins," Automatica, 20(5):645–651. 1984.
Astrom and Hagglund, "Practical Experiences of Adaptive Techniques," 1599–1606, Proceedings of the ACC90, 1990.
Cameron and Seborg, "A Self–Tuning Controller with a PID Structure," Int. J. Control., 38(2):401–417, 1983.
Ender, "Troubleshooting Your PID Control Loop," Intech, 35–48, 1992.
Hang and Sin, "Development of an Intelligent Self–Tuning PID Controller," ISA, 1101–1111, 1992.
Myron, "Self–Tuning PID Control—An Expert System Approach," IFAC Automatic Control in Petroleum, 77–80, 1986.
Radke, "Microprocesssor–Based Adaptive PID–Controllers," ISA Transactions, 27(2):43–50, 1988.

*Primary Examiner*—Joseph Ruggiero
*Attorney, Agent, or Firm*—Arnold, White & Durkee

[57] ABSTRACT

A system and method for automatically tuning a process controller used to control an industrial process, or the like. The controller is removed from closed-loop control of a process under control, and a signal is applied to the process under control to cause the process to undergo controlled self-oscillation. A first portion of the self-oscillation procedure is used to determine a Time Delay characteristic of the process under control, and a subsequent portion of the self-oscillation procedure as used to calculate an Ultimate Gain characteristic and an Ultimate Period characteristic of the process under control. These three characteristics are then used to calculate control parameters which are used to tune the controller. After tuning, the controller is placed back into a closed-loop with the process under control.

12 Claims, 5 Drawing Sheets

SYSTEM AND METHOD FOR AUTOMATICALLY TUNING A PROCESS CONTROLLER

BACKGROUND OF THE INVENTION

The present invention relates to a system and method for tuning a process controller wherein a process model is assumed and identified during controlled self-oscillation tuning.

A Proportional, Integral, Derivative (PID) controller is a common controller used in industrial processes, including computer-controlled industrial processes. Such PID controllers and their variations and combinations (for example, P, PI, PD, PID, and so forth), have enjoyed wide-spread application in the control of industrial processes, with typical industrial processes being controlled by one or more feedback loops incorporating PID controllers.

There are well established methods, for example, the Ziegler-Nichols method, for the tuning of the parameters of PID controllers in order to optimize the controller for the process under control. While manual tuning of PID controllers is possible, it is often tedious and error prone. Moreover, the process under control may change over time, thus requiring retuning.

Several automatic tuning approaches have been proposed. For example, in U.S. Pat. No. 4,549,123, controlled self-oscillation is achieved using two state or relay control in order to calculate the Ultimate Gain, and Ultimate Period, of the process under control. Once these process parameters are derived, the Ziegler-Nichols rules, or some variation of these rules, are used to define the parameters of the PID controller used to control the process.

In more recent years, progress has been made in defining optimal PID controller settings. For example, Internal Model Control-based tuning rules have been instituted and have gained recognition. However, in order to apply the Internal Model Control rules, a mathematical model of the process under control is required. The above-mentioned self-oscillation tuning methods do not assume a process model and do not provide sufficient data for complete process identification.

U.S. Pat. No. 4,758,943, discloses a method and apparatus for automatically tuning a process controller wherein the shape of the output signal obtained from a process affected with relay feedback is used to design a model-based controller, which is other than a PID controller. This limits the applicability of this particular automatic tuning process. In addition, this procedure requires complex calculations, which render the tuning procedure inappropriate for application to tuning time limited systems.

SUMMARY OF THE INVENTION

The present invention avoids the above-noted drawbacks in prior approaches to automatic tuning of process controllers by providing a method for acquiring knowledge about the process under control during controlled self-oscillation. The acquired knowledge is then used to identify parameters of a process model which, in turn, are used for controller tuning.

The present invention uses two distinct portions of a self-oscillation procedure. The first portion of the oscillation procedure is the first period of the oscillation, and the second portion of the oscillation procedure includes the periods of the remaining portions of the oscillation procedure.

During the first portion of the oscillation procedure, the control signal that is applied to the process under control is stepped from the existing level of the control signal, and the process output signal is observed. During the first portion of self-oscillation, in one embodiment of the invention, the tangent line to the process output defines the process Time Delay, $T_d$, (also referred to as Dead Time). Alternative methods of measuring process Time Delay are also presented. After the process output signal change reaches a predetermined relay hysteresis value, the relay is switched to apply to the process input an input of the opposite direction, thus driving the output signal of the process in the opposite direction. As soon as the output signal returns to the set point level, i.e., the level at which the tuning procedure was started, the relay output is switched again in the opposite direction until the output signal returns to the set point level. The relay is then switched again. This relay switching is repeated to produce one or more controlled oscillation periods, and from these periods, the Ultimate Period, $T_u$, and Ultimate Gain, $K_u$, of the process under control are determined.

Then, from these three measured quantities (Time Delay, Ultimate Gain, and Ultimate Period), and with a mathematical model of the process being assumed, the static gain, K, of the process and the process time constant, $T_c$, are calculated. Once these unknown parameters in the process model are defined, the process model may be used for tuning any type of controller, including a PID controller.

If the process under control is capable of withstanding a closed-loop step change in control signal level, the Static Gain of the process under control may be measured directly.

The present invention also employs noise protection, wherein during the second portion of the controlled-oscillation procedure, the sensing of the crossing of the process output signal and set point level is disabled for a predetermined period of time after the relay has switched. The predetermined period of time may be calculated as a function of the measured Time Delay, $T_d$.

More particularly, the invention is a method and system for tuning a control system which includes a process controlled by a process controller having tunable control parameters. The process has at least one output which is sensed by the process controller and has at least one control input connected to the process controller. In closed-loop operation, the controller senses the at least one output, and applies an appropriate control signal or signals to the at least one control input in order to maintain the process in a desired state.

Tuning comprises disconnecting the process controller from the at least one control input, applying a signal to the at least one control input to cause the process to undergo self-oscillation, monitoring the at least one output during self-oscillation, determining, from the at least one output during a first portion of the self-oscillation, a Time Delay characteristic of the process, determining from the at least one output during a second portion of the self-oscillation, an Ultimate Period characteristic and an Ultimate Gain characteristic of the process, and tuning the control system by calculating values for the tunable control parameters of the controller as functions of the Time Delay, Ultimate Period, and Ultimate Gain characteristics of the process. If the Static Gain of the process under control is measured directly, the tunable control parameters may be calculated as functions of the Static Gain, Ultimate Period and Ultimate Gain.

The invention also takes the form of a tunable control system which includes a process controller which has a process variable input and a controlled variable output, each of which are adapted for connection to a process to be controlled. Also included is a signal generator which produces an output signal, and a controllable switch which selects either the controlled variable output or the signal generator output for application to the process which is being controlled. The invention also includes a tuner, which is connected to the process controller, signal generator, and switch, which controls the switch to connect either the controller or the signal generator to the process under control. When the signal generator is connected, the tuner causes the signal generator to apply to the process under control a signal which causes the process to undergo self-oscillation. During self-oscillation, the process variable output of the process is monitored, and a Time Delay characteristic, an Ultimate Gain characteristic and an Ultimate Period characteristic of the process are determined. Then, control parameters for the process controller are calculated based upon the Time Delay, Ultimate Period and Ultimate Gain characteristics, and are applied to the controller.

These and other features and advantages of the invention will become apparent to those of skill in this art with reference to the following detailed description and appended drawings.

DETAILED DESCRIPTION

Figure 1:
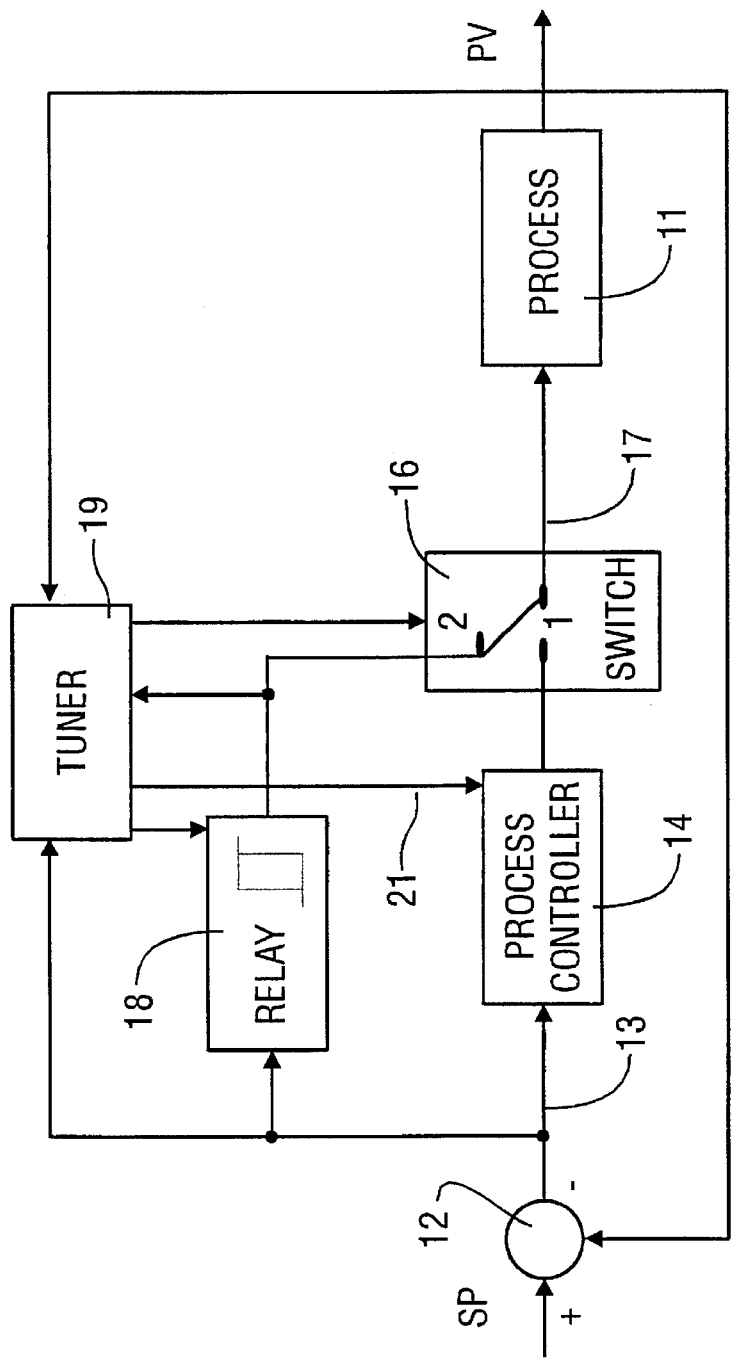
FIG. 1 is a block diagram of a process controller system, in accordance with the present invention.

Referring to FIG. 1, presented is a block diagram schematic of a system which can be regulated or controlled in accordance with the present invention. Process 11 may be any type of process which is desired to be controlled. In accordance with standard closed-loop control, an output signal or process variable, PV, is sensed from process 11 and applied to summing block 12 for comparison against a set point, SP. The difference between process variable, PV, and set point, SP, is an error signal which appears on line 13, and which is applied to process controller 14. Process controller 14 may be any type of process controller including, but not limited to, a PID controller and its variants. In closed-loop operation, switch 16 is placed in position 1, and the output of process controller 14 is applied as a control signal to process 11 through line 17. In this manner, in accordance with standard closed-loop control principles, process controller 14 operates to drive process variable, PV, to be substantially equal to set point, SP.

Also provided in accordance with the present invention are tuner 19 and a controllable signal generator, such as relay 18. When tuning of process or controller 14 is desired, tuner 19, either automatically or under operator control, places switch 16 in position 2, which connects the output of relay 18 to the input of process 11 through line 17. Tuner 19 then controls the operation of relay 18 by monitoring process variable, PV, the error signal appearing on line 13, and the output of relay 18, to perform the controlled self-oscillation tuning procedure of the present invention, described in more detail below with references to FIGS. 2–5. After completion of the self-oscillation procedure, tuner 19 returns switch 16 to position 1, and calculates control parameters and applies them to process controller 14 through line 21. Then, process 11 is thereafter controlled in a closed-loop fashion by tuned process controller 14 until such time as retuning is desired.

Upon completion of the tuning procedure, the Time Delay, $T_d$, Ultimate Gain, $K_u$, and Ultimate Period, $T_u$, of process 11 have been determined. In accordance with the present invention, process 11 is approximated by a first order model with time delay or by an integrating model with time delay. The model of process 11 is used by tuner 19 in combination with the Time Delay, Ultimate Gain and Ultimate Period determined during the self-oscillation tuning procedure, in order to calculate the proper settings for process controller 14. It will be understood, however, that other types of models may be used, including, for example, any process model that is defined by the three parameters $T_d$, $K_u$ and $T_u$.

It should be noted that any of the elements appearing in FIG. 1 may be embodied in hardware, or they may be implemented in an appropriately programmed digital computer which is programmed with software either as separate programs or modules of a common program.

Figure 2:
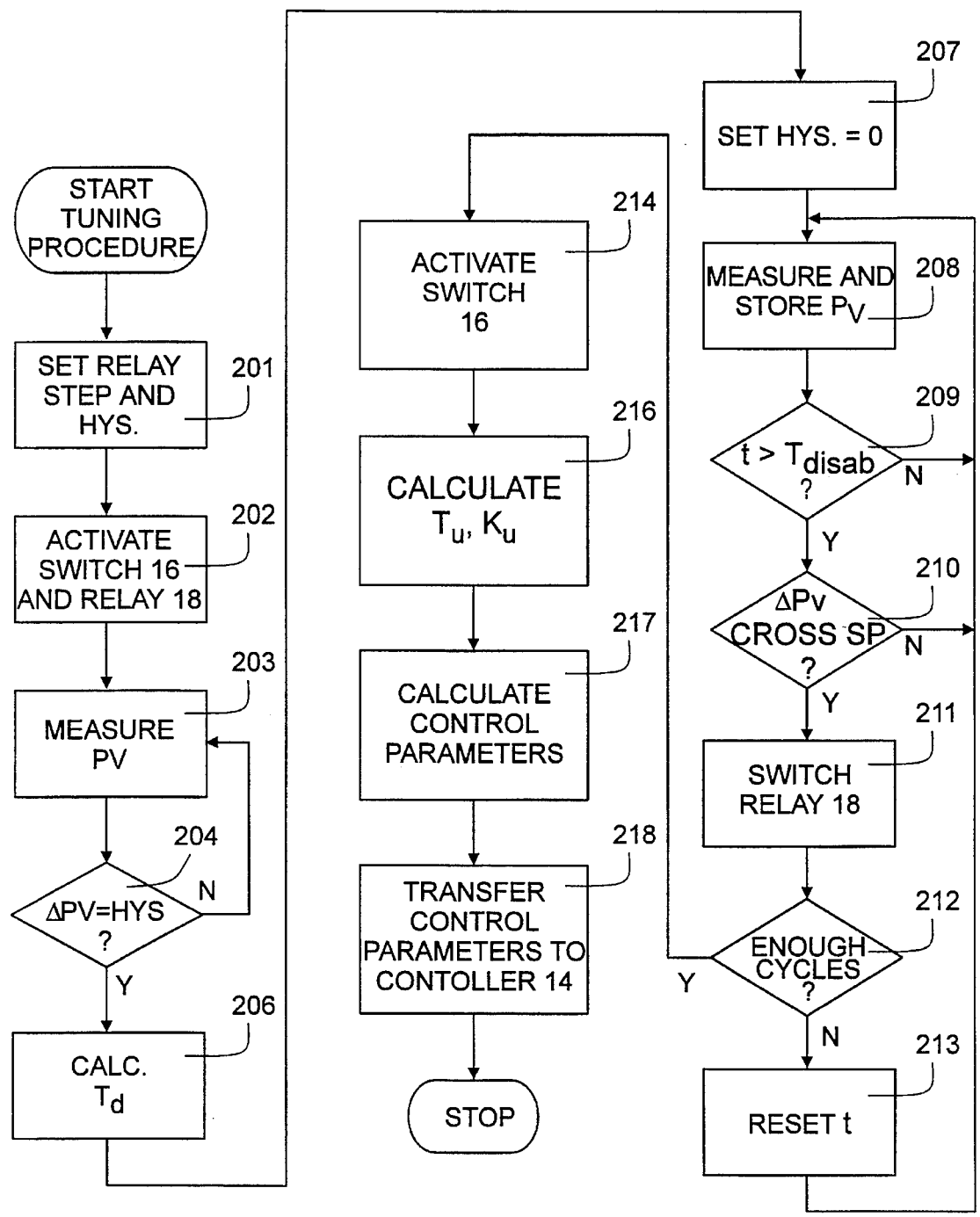
FIG. 2 is a flow chart of the method of operation of the system of claim 1.

Referring now to FIG. 2, presented is a flow chart of the operation of the system of FIG. 1 to tune process controller 14 in accordance with the present invention. When automatic tuning is desired, for example, at the request of an operator, or periodically at timed intervals throughout the control of a process, control begins in block 201 where the step size produced by relay 18 is entered. This step size, as a percentage of the maximum permissible output of process controller 14, is preferably from 2–10% of this maximum value. In operation, the relay takes one of two positions. In one of the positions, the relay 18 acts to add the step size to the existing controller output level, and in the other position, the relay 18 acts to subtract the step size from the existing controller output level. Also in block 201, the hysteresis of relay 18 is set. The hysteresis of relay 18 determines the point at which relay 18 will switch under control of the magnitude of the process variable, PV. The hysteresis of relay 18 is preferably from 0.5% to 5% of the maximum range of process variable, PV. The value of the relay hysteresis and the relay step size are determined dependent upon the noise level existent in the system, the expected process disturbances or process upsets, and the type of process under control.

Control then passes to block 202 where switch 16 is moved from position 1 to position 2, thus removing process controller 14 from the loop, and inserting relay 18. Then, the magnitude of the process variable, PV, is continuously monitored and stored by operation block 203 while decision block 204 constantly checks to see whether the process variable, PV, has deviated more than the value of the set hysteresis. When hysteresis is exceeded, control passes to block 206 where Time Delay, $T_d$, is calculated.

This can be done using one of the two methods described below with reference to FIG. 4. Control then passes to block 207 where the hysteresis of relay is set equal to 0. This then causes relay 18 to switch substantially instantaneously as soon as the process variable, PV, becomes equal to the set point level, SP. It should be noted that this also corresponds to the zero crossing of the error signal appearing on line 13. This completes the first part of the self-oscillation procedure.

Control then passes to a measurement loop including operation block 208 and decision blocks 208 and 209 wherein the magnitude of the process variable, PV, is continuously monitored. Then, if noise protection is desired or required, control passes to block 209 where elapsed time, t, is compared with a disable time, $T_{disab}$, in order to minimize the effect of noise and to reduce the possibility that noise will cause erroneous switching of relay 18. After expiration of $T_{disab}$, blocks 208 and 210 cooperate to continuously monitor process variable, PV, until a crossing of the process variable, PV, and set point level, SP, is detected. When a crossing is detected, control passes to block 211 where relay 18 is switched. Control then passes to decision block 212 where it is determined whether a sufficient number of cycles of self-oscillation has occurred for the desired level of accuracy. Determination of an appropriate disable time, $T_{disab}$, is presented below with reference to FIG. 5.

If not, elapsed time, t, is reset in block 213, and control returns to block 208. This loop continues until an appropriate number of relay cycles have been recorded (as determined by decision block 212) as desired for the required accuracy of the measurement of Ultimate Period, $T_u$.

Control then passes to block 214 where switch 16 is activated to place controller 14 back in a closed loop with process 11. Control then passes to block 216 where Ultimate Period, $T_u$, and Ultimate Gain, $K_u$ are calculated and on to block 217 where process time constant $T_c$ and static gain K are calculated in accordance with the equations below. After the control parameters are calculated they are passed to controller 14 thus completing the self-tuning procedure. It should be noted that the calculation of the control parameters could occur before switch 16 is activated to place controller 14 back in a closed loop with process 11, without departing from the scope of the invention.

Process time constant, $T_c$, is defined from the equations:

$$\pi=\omega_u T_d+\tan^{-1} \omega_u T_c, \text{ and } \omega_u=2\pi/T_u \quad (1)$$

so $$T_c=[\tan (\pi-\omega_u T_d)]/\omega_u=[\tan (\pi-2\pi T_d/T_u)]/( 2\pi/T_u) \quad (2)$$

equations 1 and 2 are derived from the first order process model which is transformed into the frequency domain in the exponential form shown in equation 3.

$$G(s)=Ke^{-sT_d}/(sT_c+1), \text{ putting } s=i\omega$$

$$G(i\omega)=Ke^{-i\omega T_d}/(i\omega T_c+1)=Ke^{-i\omega T_d}(1-i\omega T_c)/1+\omega^2 T_c^2)$$

$$G(i\omega)=Ke^{-i\omega T_d}e^{-i\Phi}/\text{sqrt}(1=\omega^2 T_c^2)=Ke^{-i(\omega T_d+\Phi)}/\text{sqrt}(1+\omega^2 T_c^2) \quad (3)$$

where $\Phi=\tan^{-1} \omega T_c$, and K is the Process Static Gain.

At oscillation at the Ultimate Period, $T_u$, process gain is equal to the inverse of the Ultimate Gain $K_u$, i.e., $1/K_u$.

Setting $G(i\omega)=1/K^u$ when $\omega=\omega_u$ in equation 3, and since $|e^{-i\omega T_d}|=1$, Process Static Gain, K, is determined according to equation 4.

$$K=1/K_u[\text{sqrt}(1+4\pi^2 T_c^2/T_u^2)] \quad (4)$$

Alternately, if the process environment can accept a closed loop perturbation (for example, a step change) in the control signal level, Process Static Gain K can be measured directly by comparing the magnitude of the change in the output of the process to the magnitude of the change in control signal level.

From Time Delay $T_d$, Process Time Constant, $T_c$, and (either calculated or measured) Process Static Gain K, the control parameter settings for process controller 14 may then be determined. Preferably, when a PID controller is used as process controller 14, Internal Model Controller (IMC) rules are used. For the ideal parallel PID controller which takes the form:

$$C(s)=K_c[1+1/sT_i+sT_{der}], \quad (5)$$

the controller settings are computed as follows: controller gain $K_c$ according to the equation:

$$K_c=1/K[(T_c+T_d/2)/[T_d(c+1)]], \quad (6)$$

wherein, c is a dimensionless parameter which is selected to adjust controller sensitivity. In general, the higher c, the less sensitive the controller. c is preferably between 0.3 and 0.6.

Controller integral time $T_i$ is computed according to the equation:

$$T_i=T_c+T_d/2, \quad (7)$$

and controller derivative time $T_{der}$ is computed according to the equation:

$$T_{der}=T_c T_d/(2T_c+T_d). \quad (8)$$

For various industrial implementations of the PID controller, for example, series PID, and non-interacting PID, appropriate known modifications of equations 6, 7 and 8 are used.

It should also be noted that the process parameters $T_d$, $T_c$, and $K_u$ determined in accordance with the present invention may be used to calculate controller parameters when other than IMC tuning rules are used. Other types of acceptable tuning rules include tuning with error integration criteria, for example Integrated Absolute Error (IAE) tuning, Integrated Time Absolute Error (ITAE) tuning, or Integrated Squared Error (ISE) tuning. The details of these alternative tuning rules are provided, for example, in A. Kaya et al., "Tuning of PID Controls of Different Structures," *Control Engineering*, July, 1988, pp. 62–65, the disclosure of which is incorporated herein by reference.

In addition, for the calculations of process time constant, $T_c$, it is possible to use other formulae which relate Ultimate Period, $T_u$, and Time Delay $T_d$, to process time constant, $T_c$. For example, these three parameters may be related according to the heuristic expression:

$$T_u=2[1+(T_c/(T_c+T_d))^{0.65}], \quad (9)$$

or according to the theoretical formula:

$$T_u=2T_c\ln |2e^{T_d/T_c}-1| \quad (10)$$

Figure 3:
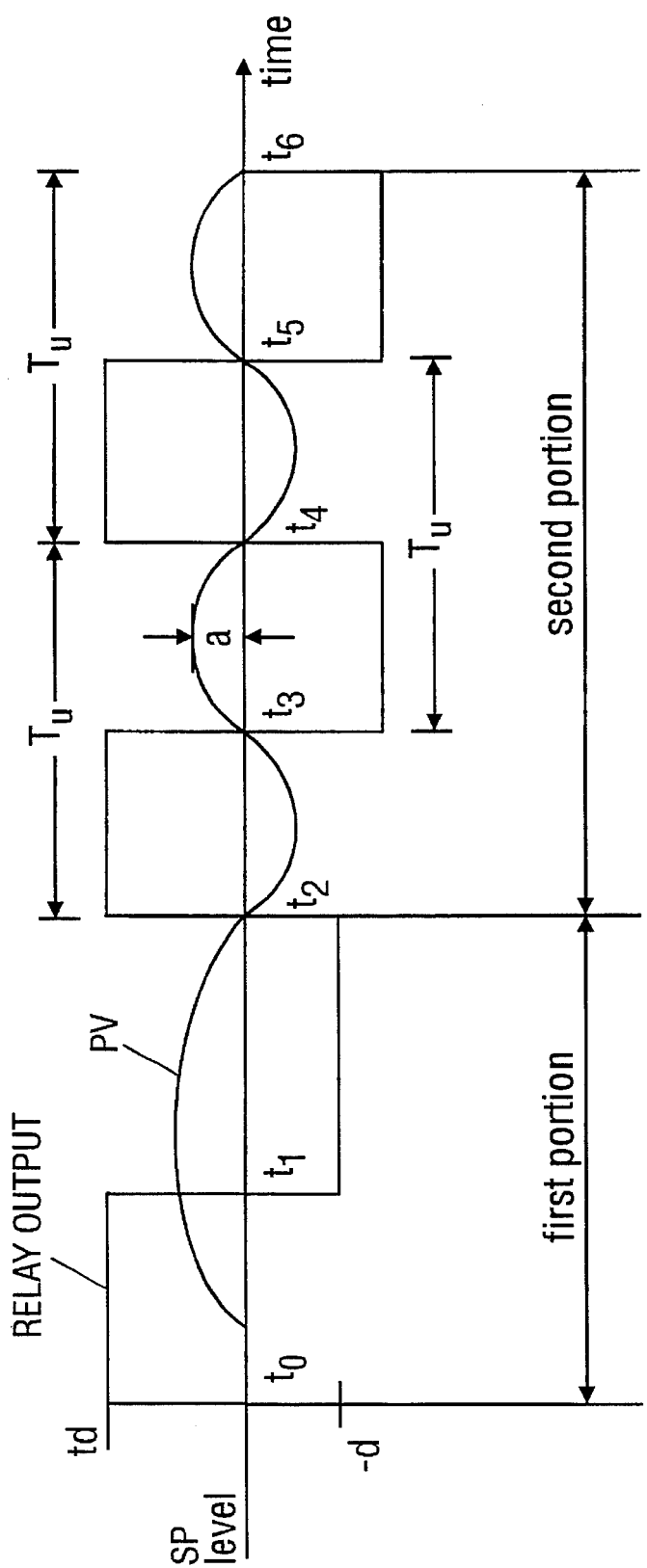
FIG. 3 is a graph of the process input and process output signals during the two parts of the controlled self-oscillation procedure of the present invention.
Figure 4:
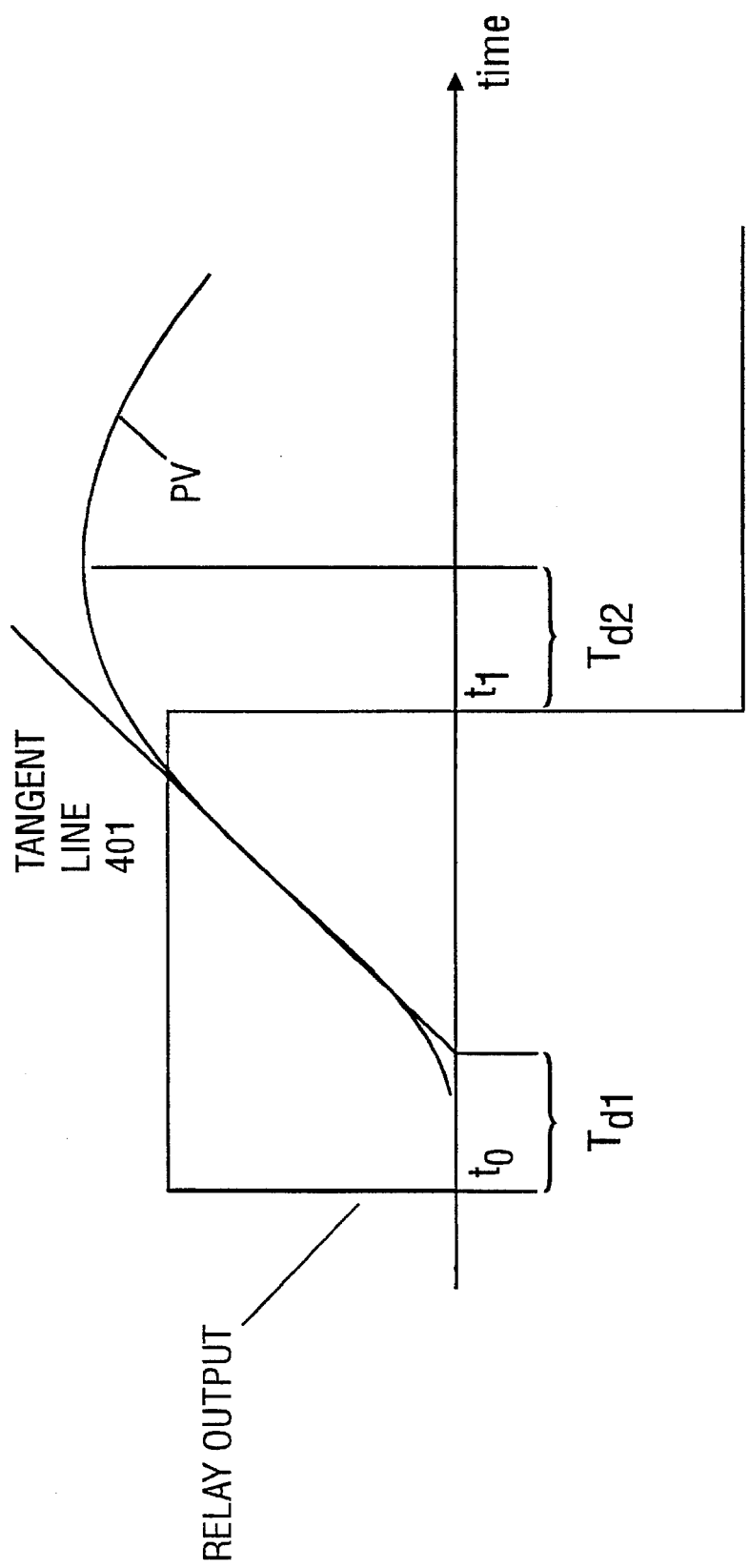
FIG. 4 is a detail of the first portion of the graph of FIG. 3.
Figure 5:
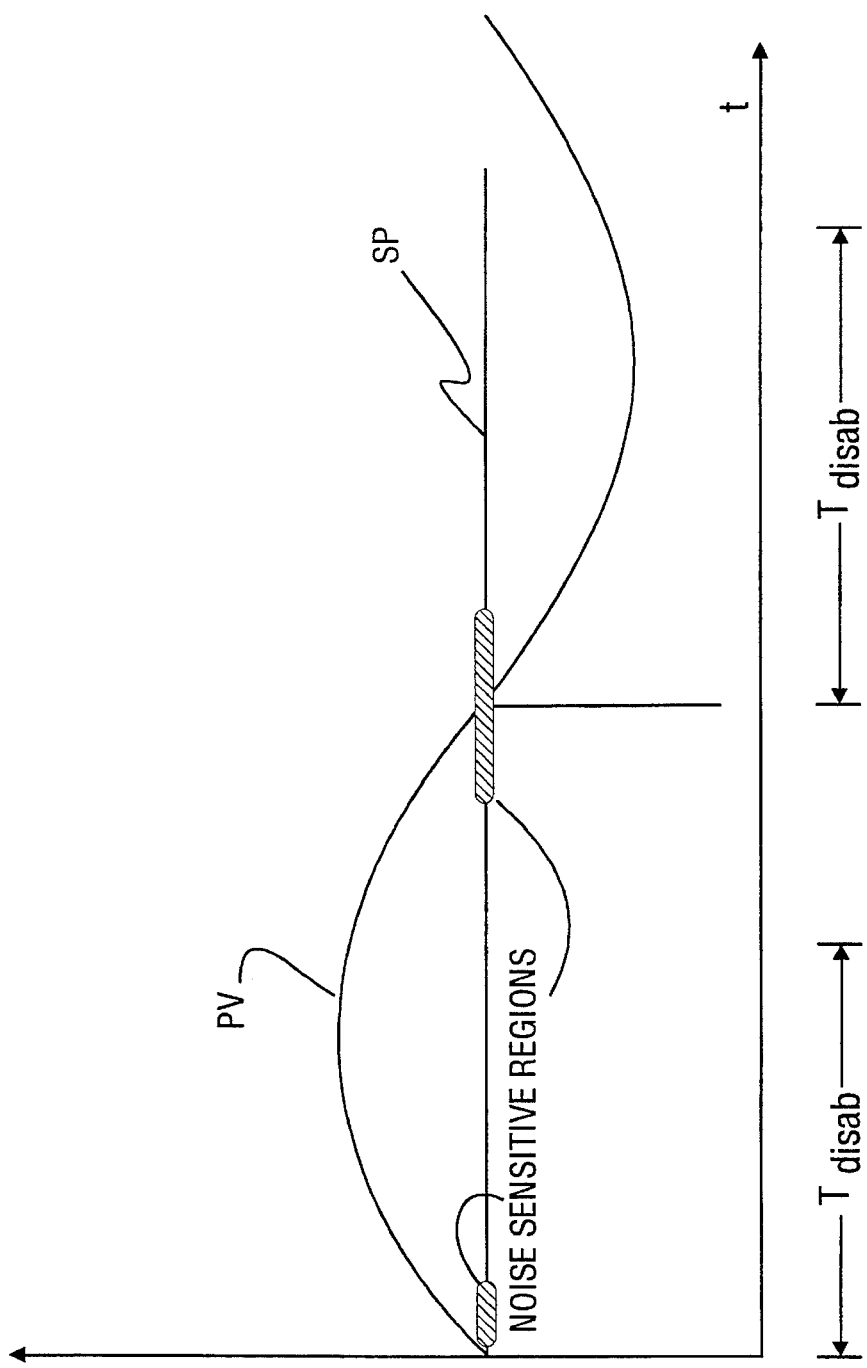
FIG. 5 is a graph illustrating the noise protection feature of the present invention.

FIGS. 3, 4 and 5 illustrate graphically the automatic tuning method of the present invention. Referring to FIG. 3, shown is a time graph of a process variable, PV. Superimposed on the graph of process variable, PV is the output of relay 18. It should be noted that the output of relay 18, and process variable, PV, do not have the same scale, and they are plotted together in FIG. 3 merely to show their timing relationship.

At time, $t_0$, the relay output is switched to add a positive step. Then, at the time $t_1$, is determined that process variable, PV, has reached the hysteresis level, causing relay output 18 to switch from applying a positive step to applying a negative step. Then, at time $t_2$, it is determined that process variable, PV, has crossed over the initial set point level. Since the hysteresis of relay 18 has now been removed, relay 18 immediately switches from applying a negative step to applying a positive step. At the next zero crossing, time $t_3$, another zero-crossing is detected, causing relay 18 to switch once again, and so forth for times $t_4$, $t_5$, and $t_6$.

In accordance with the above-terminology, the first portion of the self-oscillation procedure is between time $t_0$ and time $t_2$, and the second portion of the self-oscillation procedure begins at time $t_2$.

Time Delay $T_d$ is then calculated from the first portion of the self-oscillation, as shown in more detail with reference to FIG. 4. Ultimate Period, $T_u$, is calculated as the average of differences between every other zero-crossing of process variable PV (i.e., the average of the difference between time $t_2$ and $t_4$, the difference between $t_3$ and $t_5$, and the difference between $t_4$ and $t_6$).

Ultimate Gain, $K_u$, is calculated from the formula:

$$K_u = 4d/\pi a$$

Where: d is the selected relay step size, and a is the average amplitude of the oscillation in the process variable during the second portion of the self oscillation. For completeness, the quantities $T_u$, d and a are illustrated in FIG. 3.

Referring now to FIG. 4, shown is an enlarged portion of the graph of FIG. 3, beginning at time $t_0$, used to illustrate the calculation of Delay Time, $T_d$.

Delay Time, $T_d$ may be calculated using one of two methods. In a first method, a tangent 401 is calculated from the point of maximum slope of process variable, PV. The tangent 401 is then extrapolated to intercept the set point line 402. Intercept, $T_{d1}$, produces a measure of process Time Delay, $T_d$.

Alternatively, process Time Delay, $T_d$, may be calculated as the time from the switching of relay 18 (time $t_1$), to the time at which process variable, PV reaches a maximum (time $t_1 + T_{d2}$).

Yet another alternative is to calculate $T_{d1}$ using the first method, calculate $T_{d2}$ using the second method, and then to calculate $T_d$ as the average of $T_{d1}$ and $T_{d2}$.

FIG. 5 is a graph which illustrates the noise protection function of block 209, of the flow chart of FIG. 2. As illustrated in FIG. 5, after each time relay 18 is switched, the switching of relay 18 is disabled for a pre-determined time period in order to avoid erroneous switching of relay 18 as a result of noise. This noise protected time interval, $T_{disab}$, is shown in FIG. 5. It has been determined that an effective time for the noise protected time interval $T_{disab}$, may be calculated as a function of the process Time Delay, $T_d$. Specifically, $T_{disab}$ may be in the range of between 50% and 70% of $T_d$.

Although the present invention has been described with respect to several embodiments, it will be understood by those of skill in this art that additions, deletions and substitutions may be made to these disclosed embodiments without departing from the spirit and scope of the invention.

What is claimed is:

1. A method of tuning a control system including a process controlled by a process controller having tunable control parameters, said process having at least one output which is sensed by said process controller and having at least one control input connected to said process controller, said method comprising:

disconnecting said process controller from said at least one control input;

applying a signal to said at least one control input of said process to cause said process to undergo controlled self-oscillation;

monitoring said at least one output of said process during said controlled self-oscillation;

determining, from said at least one output of said process during said controlled self-oscillation, a time delay characteristic, an ultimate period characteristic, and an ultimate gain characteristic of said process; and tuning said control system by calculating values for said tunable control parameters of said controller as functions of said time delay, ultimate period and ultimate gain of said process.

2. The method of claim 1, said determining step comprising:

determining, from said at least one output during a first portion of said controlled self-oscillation, said time delay characteristic of said process; and determining, from said at least one output during a second portion of said controlled self-oscillation, said ultimate period characteristic and said ultimate gain characteristic of said process.

3. The method of claim 1, said applying step comprising, applying a square-wave signal superimposed on a predetermined control signal to said control input of said process.

4. The method of claim 3, said applying step further comprising:

applying a first square-wave signal superimposed on said predetermined control signal for a first portion of said controlled self-oscillation; and applying a second square-wave signal superimposed on said predetermined control signal for a second portion of said controlled self-oscillation.

5. The method of claim 4, said step of determining said time delay characteristic comprising:

detecting a slope of said at least one output during application of said first square-wave signal; and determining said time delay characteristic as a function of said slope.

6. The method of claim 5, said step of determining said ultimate period characteristic and said ultimate gain characteristic, comprising:

measuring, during application of said second square-wave signal, an amplitude and period of said self-oscillation of said at least one output; and calculating said ultimate period characteristic and said ultimate gain characteristic as functions of said amplitude and period.

7. The method of claim 1, said process controller comprising a PID controller, and said tunable control parameters comprising, controller gain, $K_c$, controller integral time, $T_i$, and controller derivative time, $T_{der}$.

8. The method of claim 1, said process being modeled as a first order process with time delay, said tuning step comprising:

calculating a time constant of said process as a function of said time delay characteristic and said ultimate period characteristic of said process;

determining a static gain of said process; and calculating said values for said tunable control parameters of said controller as a function of said [Time Delay, Time Constant and Static Gain time delay characteristic, time constant and static gain of said process.

9. The method of claim 8, said step of determining said static gain comprising:

applying a perturbation to said control input of said process;

measuring a magnitude of a change in said process output due to said perturbation; and calculating said static gain as a function of relative magnitudes of said perturbation and said change.

10. The method of claim 8, said step of determining said static gain of said process comprising, calculating said static gain as a function of said time delay characteristic, time constant and ultimate gain characteristic of said process.

11. A method of tuning a control system including a process controlled by a process controller having tunable control parameters, said process having a process output which is sensed by said process controller and having a control input connected to said process controller, comprising:

disconnecting said process controller from said control input;

applying a signal having a first portion and a second portion to said control input of said process to cause said process to undergo controlled self-oscillation;

monitoring said process output during said controlled self-oscillation;

determining at least one process characteristic from said process output during application of said first portion of said signal;

determining at least one additional process characteristic from said process output during application of said second portion of said signal; and tuning said control system by calculating values for said tunable control parameters as functions of said process characteristics.

12. A tunable control system comprising:

a process controller having a process variable input and a controlled variable output, said input and output being adapted for connection to a process to be controlled;

a signal generator producing a controllable generator signal adapted for connection to said process to be controlled; and a tuner, connected to said process controller and signal generator, and adapted for connection to said process to be controlled, said tuner including:

means for disconnecting said controlled variable output from said process and for connecting said controllable generator signal to said process;

means for controlling said signal generator to apply a signal to said process to cause said process to undergo controlled self-oscillation;

means for monitoring said process variable during said controlled self-oscillation;

means for determining, from a first portion of said controlled self-oscillation, a time delay of said process, and for determining from a second portion of said controlled self-oscillation, an ultimate gain and an ultimate period of said process; and means for calculating control parameters for said process controller, based upon on said time delay, ultimate period and ultimate gain of said process.

* * * * *

UNITED STATES PATENT AND TRADEMARK OFFICE
CERTIFICATE OF CORRECTION

PATENT NO.    :    5,453,925
DATED         :    September 26, 1995
INVENTOR(S)   :    Wilhelm K. Wojsznis and Terrence L. Blevins It is certified that error appears in the above-identified patent and that said Letters Patent is hereby corrected as shown below:

In claims 8, column 8, lines 66 and 67, delete "[Time Delay, Time Constant and Static Gain".

Signed and Sealed this

Second Day of January, 1996

Attest:

BRUCE LEHMAN

Attesting Officer    Commissioner of Patents and Trademarks